United States Patent
Crawford (12)

(10) Patent No.: US 9,109,717 B2
(45) Date of Patent: Aug. 18, 2015

(54) ELECTRONICALLY CONTROLLED PRESSURE RELIEF VALVE

(75) Inventor: Paul A. Crawford, Houston, TX (US)

(73) Assignee: FMC Technologies, Inc., Houstom, TX (US)

( * ) Notice: Subject to any disclaimer, the term of this patent is extended or adjusted under 35 U.S.C. 154(b) by 944 days.

(21) Appl. No.: 13/135,532

(22) Filed: Jul. 8, 2011

(65) Prior Publication Data

US 2013/0008519 A1    Jan. 10, 2013

(51) Int. Cl.
| | | |
|---|---|---|
| G05D 16/20 | (2006.01) |
| F16K 31/124 | (2006.01) |
| F16K 31/42 | (2006.01) |
| F16K 37/00 | (2006.01) |
| F16K 17/02 | (2006.01) |

(52) U.S. Cl.
CPC ............. *F16K 31/124* (2013.01); *F16K 17/02* (2013.01); *F16K 31/42* (2013.01); *F16K 37/005* (2013.01); *G05D 16/2093* (2013.01)

(58) Field of Classification Search
CPC . F16K 17/10105; F16K 17/105; F16K 31/42; F16K 31/124; F16K 37/005; F16K 17/02; G05D 16/2086; G05D 16/2093
USPC ............ 137/487.5, 488, 492, 516.11, 516.13, 137/516.15, 528, 532, 625.33, 625.34, 137/625.37; 251/30.01, 30.02, 30.05
See application file for complete search history.

(56) References Cited

U.S. PATENT DOCUMENTS

| | | | |
|---|---|---|---|
| 3,250,294 A | | 5/1966 | Hipple |
| 3,308,846 A | * | 3/1967 | Yuile ......................... 137/487.5 |
| 3,548,866 A | | 12/1970 | Kaiser et al. |
| 3,648,718 A | * | 3/1972 | Curran .......................... 137/269 |
| 3,706,320 A | * | 12/1972 | Kalsi ............................. 137/487 |
| 3,771,554 A | * | 11/1973 | Hassall ......................... 137/491 |
| 3,890,992 A | | 6/1975 | Wolz et al. |
| 4,172,466 A | | 10/1979 | Pattarini et al. |
| 4,206,781 A | | 6/1980 | Salter |
| 4,463,776 A | | 8/1984 | Hewlett |
| 4,625,756 A | | 12/1986 | Riedel et al. |
| 4,679,586 A | | 7/1987 | Riedel et al. |

(Continued)

FOREIGN PATENT DOCUMENTS

GB    1078110    8/1967

*Primary Examiner* — William McCalister
(74) *Attorney, Agent, or Firm* — Henry C. Query, Jr.

(57) ABSTRACT

A pressure relief valve comprises a valve body which includes an inlet bore that is connectable to a flow line, an outlet bore that is connectable to a vent line and a valve bore that extends to between the inlet and outlet bores. A valve member is axially movable in the valve bore between a closed position in which fluid in the flow line is prevented from flowing between the inlet and outlet bores and an open position in which the fluid in the flow line is permitted to flow between the inlet and outlet bores. A fluid chamber is located in the valve bore adjacent the valve member, a source of hydraulic fluid is connected to the fluid chamber, and a solenoid operated pilot valve is connected between the fluid chamber and the source of hydraulic fluid. During operation of the pressure relief valve, the pilot valve is opened to fill the fluid chamber with hydraulic fluid, then is closed to trap the hydraulic fluid in the fluid chamber and thereby maintain the valve member in its closed position against pressure in the flow line, and then, when the pressure in the flow line reaches a predetermined level, is opened to release the hydraulic fluid from the fluid chamber and thereby allow the valve member to move from its closed position to its open position.

31 Claims, 4 Drawing Sheets

(56) References Cited

U.S. PATENT DOCUMENTS

| | | | |
|---|---|---|---|
| 4,699,351 A | | 10/1987 | Wells |
| 4,873,817 A | | 10/1989 | Harms |
| 4,968,221 A | * | 11/1990 | Noll ............................. 417/295 |
| 5,806,553 A | * | 9/1998 | Sidwell ...................... 137/487.5 |
| 6,189,563 B1 | * | 2/2001 | Taylor ........................ 137/487.5 |
| 7,458,393 B2 | * | 12/2008 | Weingarten .............. 137/625.34 |
| 2008/0078586 A1 | | 4/2008 | Tettleton et al. |

* cited by examiner

ELECTRONICALLY CONTROLLED PRESSURE RELIEF VALVE

The present invention is directed to a pressure relief valve for relieving overpressure in a flow line. More specifically, the invention is directed to a pressure relief valve which is maintained in its normally closed position by a substantially non-compressible hydraulic fluid that is trapped in a fluid chamber by a solenoid controlled pilot valve. The pilot valve is actuated by a controller in response to signals generated by a pressure transducer. Thus, when the pressure signals indicate that an overpressure event is occurring in the flow line, the controller will actuate the pilot valve to release the hydraulic fluid from the fluid chamber and thereby allow the valve to open and relieve the overpressure in the flow line.

BACKGROUND OF THE INVENTION

Pressure relief valves are commonly used to protect flow lines and associated equipment from overpressure events. Such valves normally include an inlet which is connected to the flow line, an outlet which is connected to a vent line and a valve element which is movable between a closed position in which the outlet is isolated from the inlet and an open position in which the outlet is open to the inlet. In certain types of pressure relief valves the valve element is maintained in its normally closed position by fluid in a pressure cylinder which acts on a piston that is connected to the valve element. In order to maintain the valve element closed against normal operating pressure in the flow line, the fluid in the pressure cylinder is pressurized to a predetermined set point. Then, when the pressure in the flow line exceeds a predetermined maximum value, the force imbalance created by the overpressure will force the valve element open and allow the fluid in the flow line to flow through the outlet and into the vent line.

In the well servicing industry, well operators sometimes require the use of "full opening" pressure relief valves. These types of pressure relief valves employ a large pressure cylinder which is filled with a compressible gas. The pressure in the pressure cylinder is limited by the available gas storage supply and therefore usually requires that the area of the piston be six to eight times larger than the area of the valve element which seals the inlet. In addition, the gas pressure in the cylinder must be maintained at a predetermined set point pressure to allow the valve element to open at the desired maximum line pressure.

However, full open pressure relief valves have several shortcomings. First, they normally require additional components such as a control panel, a high pressure gas bottle and multiple hoses. Consequently, these valves are usually complex, large and difficult to set up. In addition, the gas cylinder, although precharged, will still exhibit a spring rate that requires the line pressure to exceed the desired maximum by some amount before the valve fully opens. Thus, even if the valve comprises quick exhaust ports, the large volume of gas required to be exhausted from the pressure cylinder will delay full opening. Furthermore, the pressure in the gas cylinder will often change with changes in ambient temperature at the job site. For example, a 40 degree change in temperature may increase the set point by about 10%, which has been deemed unacceptable by many well operators.

SUMMARY OF THE INVENTION

In accordance with the present invention, these and other limitations in the prior art are addressed by providing a pressure relief valve which comprises a valve body which includes an inlet bore that is connectable to a flow line, an outlet bore that is connectable to a vent line and a valve bore that extends to between the inlet and outlet bores; a valve member which is axially movable in the valve bore between a closed position in which fluid in the flow line is prevented from flowing between the inlet and outlet bores and an open position in which the fluid in the flow line is permitted to flow between the inlet and outlet bores; a fluid chamber which is located in the valve bore adjacent the valve member; a source of hydraulic fluid which is connected to the fluid chamber; and a solenoid operated pilot valve which is connected between the fluid chamber and the source of hydraulic fluid. During operation of the pressure relief valve the pilot valve is opened to fill the fluid chamber with hydraulic fluid, then is closed to trap the hydraulic fluid in the fluid chamber and thereby maintain the valve member in its closed position against pressure in the flow line, and then, when the pressure in the flow line reaches a predetermined level, is opened to release the hydraulic fluid from the fluid chamber and thereby allow the valve member to move from its closed position to its open position.

In accordance with one embodiment of the invention, the valve member comprises a generally cylindrical poppet which comprises an upper end portion adjacent which the fluid chamber is located and a lower end portion which in the closed position of the poppet blocks the fluid from flowing between the inlet and outlet bores and in the open position of the poppet permits the fluid to flow between the inlet and outlet bores. In one example of this embodiment, the lower end portion of the poppet may extend through and seal against a seal which is positioned between the inlet and outlet bores to thereby prevent fluid in the flow line from flowing between the inlet and outlet bores. In another example of this embodiment, a seal mounted on the lower end portion of the poppet may seal to a portion of the pressure relief valve located between the inlet and outlet bores to thereby prevent fluid in the flow line from flowing between the inlet and outlet bores.

In accordance with another embodiment of the invention, the pressure relief valve comprises a pressure transducer which generates signals indicative of the pressure in the flow line and a controller which actuates the pilot valve in response to the signals generated by the pressure transducer. Accordingly, when the pressure in the flow line reaches the predetermined level, the controller opens the pilot valve to release the hydraulic fluid from the fluid chamber and thereby allow the valve member to move from its closed position to its open position.

In accordance with a further embodiment of the invention, the poppet is slideably supported in a poppet cage which is positioned in the valve bore and which comprises a number of transverse flow ports which are located between the inlet and outlet bores. In one example of this embodiment, the lower end portion of the poppet seals against a rod seal which is positioned between the inlet bore and the flow ports. In another example of this embodiment, a seal mounted on the lower end portion seals to a portion of the pressure relief valve located between the inlet and outlet bores to thereby prevent fluid in the flow line from flowing between the inlet bore and the flow ports.

In accordance with yet another embodiment of the invention, the fluid chamber is located within the poppet cage. In this embodiment, the pilot valve may be connected to the fluid chamber through a port in the poppet cage, the pilot valve may connected to the port through a hole in the valve body, and the hole may be connected to the port through a sealed annulus between the poppet cage and the valve bore.

In accordance with still another embodiment of the invention, the poppet cage is retained in the valve bore by a cap member which is secured to the valve body. In this embodiment, the pressure relief valve may comprise a stem which extends axially from the poppet through a corresponding hole in the cap member. Accordingly, the stem may provide a visual indication of the open or closed position of the poppet.

In accordance with a further embodiment of the invention, the pressure relief valve comprises a hydraulic reducing valve which is connected between the pilot valve and the source of hydraulic fluid. In this embodiment, the pressure relief valve may also comprise a hydraulic sump and a hydraulic relief valve which is connected between the pilot valve and the hydraulic sump, wherein when the pressure in the flow line reaches the predetermined level, the hydraulic fluid is conveyed from the pilot valve through the hydraulic relief valve and into the hydraulic sump. Also, the valve member may comprise a generally cylindrical poppet which is slideably supported in a poppet cage that is positioned in the valve bore, the pilot valve may be connected to the fluid chamber through a port in the poppet cage, and the diameter of the port may be selected so that, when the pilot valve is open, the pressure between the port and the hydraulic reducing and hydraulic relief valves does not exceed a pressure rating of the hydraulic reducing and hydraulic relief valves.

In one alternative embodiment of the invention, the source of hydraulic fluid comprises an accumulator which is charged with hydraulic fluid at a pressure which is sufficient to fill the fluid chamber when the pilot valve is initially opened. In another alternative embodiment of the invention, the source of hydraulic fluid comprises a spring return cylinder which is charged with hydraulic fluid at a pressure which is sufficient to fill the fluid chamber when the pilot valve is initially opened.

The present invention also provides a method for operating a pressure relief valve which comprises an inlet bore that is connectable to a flow line, an outlet bore that is connectable to a vent line, and a valve bore that extends to between the inlet and outlet bores. The method comprises providing a valve member which is axially movable in the valve bore between a closed position in which the valve member blocks fluid in the flow line from flowing between the inlet and outlet bores and an open position in which the valve member permits fluid in the flow line from flowing between the inlet and outlet bores; providing a fluid chamber which is located in the valve bore adjacent an end of the valve member; connecting to the fluid chamber to a source of hydraulic fluid; providing a solenoid operated pilot valve which is connected between the fluid chamber and the source of hydraulic fluid; opening the pilot valve to fill the fluid chamber with hydraulic fluid; then closing the pilot valve to trap the hydraulic fluid in the fluid chamber and thereby maintain the valve member in its closed position against pressure in the flow line; and then, when the pressure in the flow line reaches a predetermined level, opening the pilot valve to release the hydraulic fluid from the fluid chamber and thereby allow the valve member to move from its closed position to its open position.

Thus, the pressure relief valve of the present invention offers many advantages over prior art pressure relief valves. Because the fluid chamber is filled with a substantially non-compressible hydraulic fluid instead of a compressible gas, the poppet will remain closed whether or not the set point of the valve changes over time. In addition, the pressure relief valve of the present invention does not employ a force imbalance across the poppet in order to open the poppet when the set point is reached. Instead, the poppet is opened immediately when the pilot valve opens in response to the signals generated by the pressure transducer. Therefore, the pressure relief valve of the present invention provides for a relatively quick response to an overpressure event with relatively high accuracy.

These and other objects and advantages of the present invention will now be described with reference to the accompanying drawings. In the drawings, the same reference numbers may be used to denote similar components in the various embodiments.

DETAILED DESCRIPTION OF THE INVENTION

Figure 1:
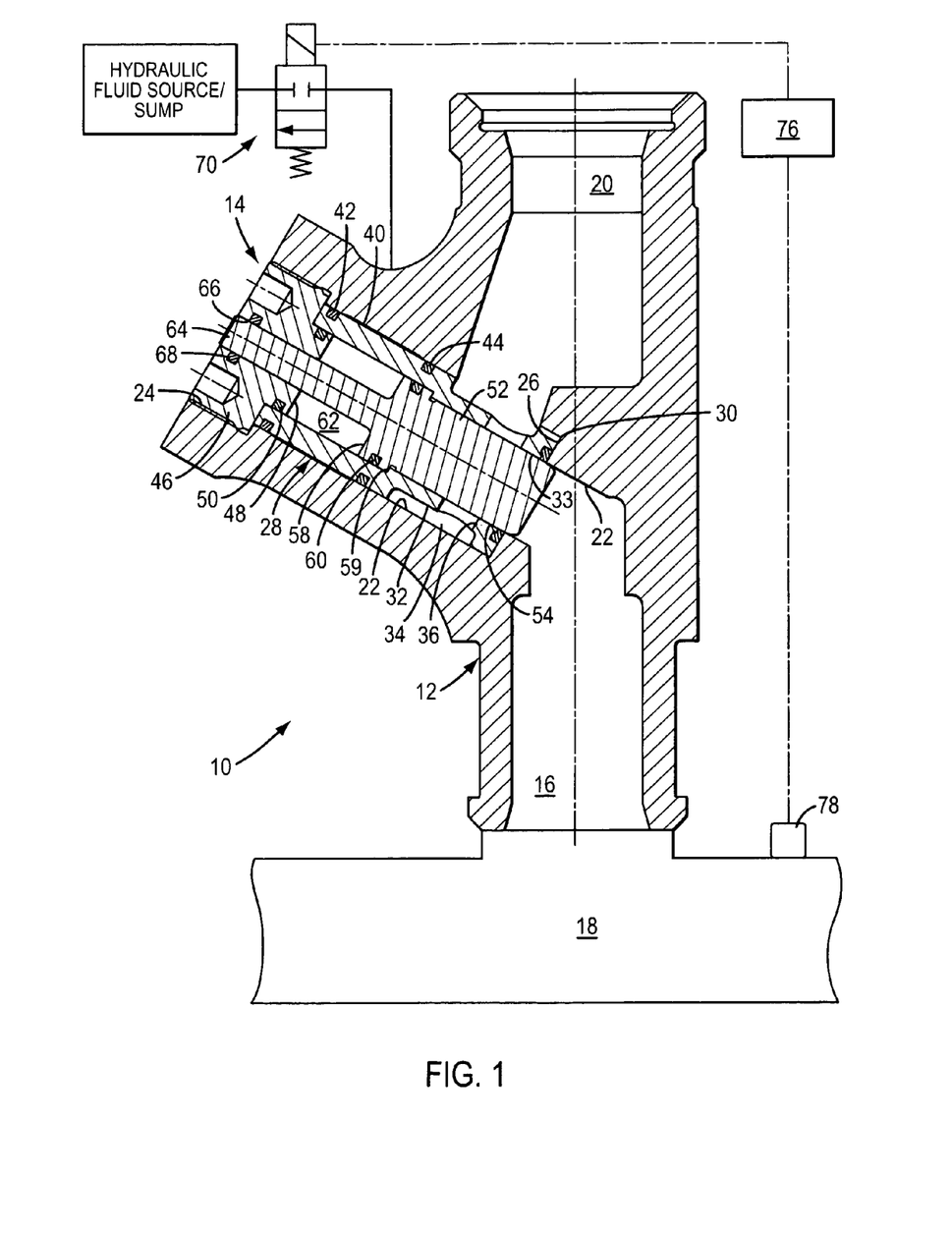
FIG. 1 is a cross sectional, partially schematic view of one embodiment of the pressure relief valve of the present invention.

The pressure relief valve in accordance with one embodiment of the present invention will now be described with reference to FIG. 1. In this embodiment, the pressure relief valve, generally 10, comprises a generally Y-shaped valve body 12 and a poppet valve 14 which is mounted in the valve body. The valve body, which may comprise a standard Y connector, includes an inlet bore 16 which is connectable to a flow line 18, an outlet bore 20 which is connectable to a vent line (not shown), and a valve bore 22 which extends to between the inlet and outlet bores. In the embodiment of the invention shown in FIG. 1, the valve bore 22 includes an enlarged diameter end portion 24 and an annular shoulder 26 which is located between the inlet and outlet bores 16, 20.

Figure 2:
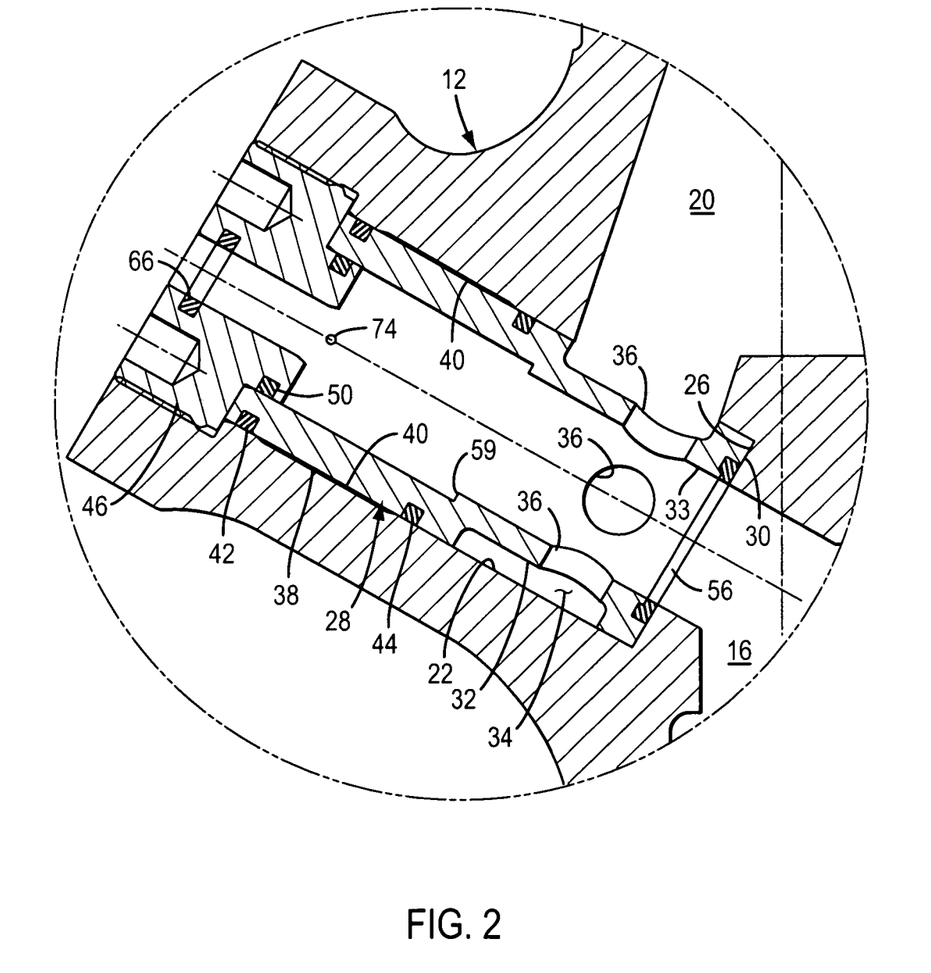
FIG. 2 is an enlarged cross sectional view of the pressure relief valve shown in FIG. 1 with the poppet component removed for clarity.

The poppet valve 14 includes a generally tubular poppet cage 28 which is positioned in the valve bore 22. Referring also to FIG. 2, the poppet cage 28 includes a circular seat 30 which engages the shoulder 26 of the valve bore 22. A lower portion 32 of the poppet cage 28 located above the seat 30 has an inner diameter surface 33 and an outer diameter which is smaller than the diameter of the valve bore 22 to thereby form a lower annulus 34 which communicates with the outlet bore 20. A number of flow ports 36 extend transversely through the lower portion 32 between the inner diameter surface 33 and the lower annulus 34. An upper portion 38 of the poppet cage 22 has an outer diameter which is slightly smaller than the diameter of the valve bore 22 to thereby form an upper annulus 40 between the poppet cage and the valve bore. Alternatively, the inner diameter of the valve bore 22 may be recessed to form the upper annulus 40. In the embodiment of the invention shown in FIGS. 1 and 2, the upper annulus 40 is bounded by upper and lower ring seals 42, 44 which are positioned between the poppet cage 28 and the valve bore 22. The purpose of this arrangement will be described below.

Figure 2A:
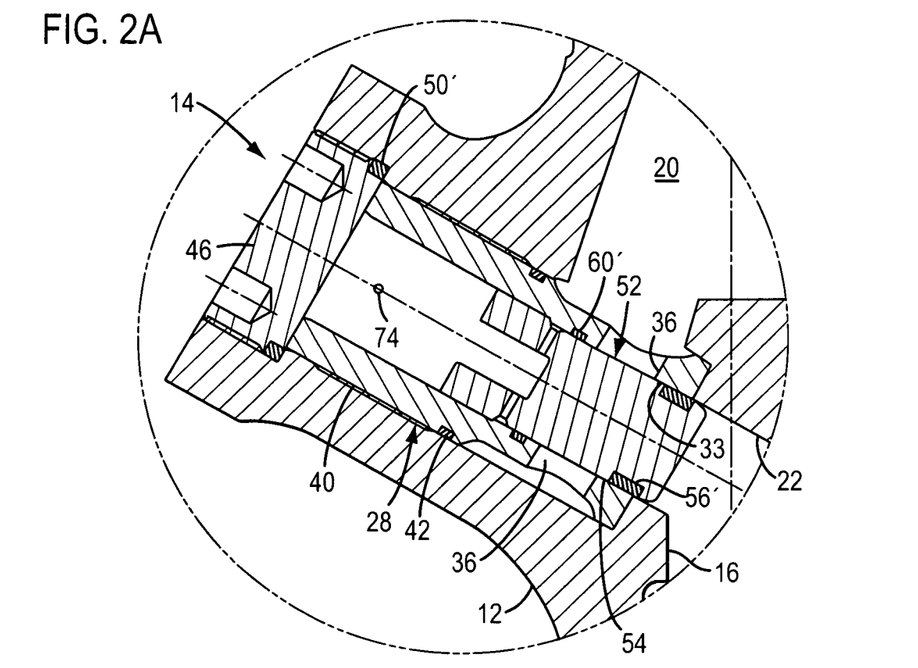
FIG. 2A is an enlarged cross sectional view of the poppet valve component of a second embodiment of the pressure relief valve of the present invention.

The poppet cage 28 is retained in the valve bore 22 by a body cap 46 which is threaded into the enlarged diameter end portion 24. In this embodiment, the body cap 46 includes a lower end portion 48 which is received in the top of the poppet cage 28 and is sealed thereto by a suitable ring seal 50. In an alternative embodiment of the invention which is shown in FIG. 2A, the body cap 46 is sealed directly to the valve body 12 by a suitable cap seal 50'. In this embodiment, the upper annulus 40 between the poppet cage 28 and the valve bore 22 is defined by the lower ring seal 42 and the cap seal 50'. When assembling the pressure relief valve 10, the body cap 46 is ideally tightened to a degree which is sufficient to generate a pre-load on the poppet cage 28 which will maintain the contact between the shoulder 26 and the seat 30 at the maximum anticipated working pressure in the flow line 18.

The poppet valve 14 also includes a closure member which blocks the flow of fluid from the inlet bore 16 to the outlet bore 20 when the pressure relief valve 10 is in the closed position. In the embodiment of the invention shown in FIG. 1, for example, the poppet valve 14 may comprise a poppet 52 which is slideably supported in the poppet cage 28 and which functions to seal the inlet bore 16 from the flow ports 36, preferably as the poppet moves slightly relative to the flow ports. As shown in FIG. 1, the poppet 52 includes a lower end portion 54 which when the poppet valve 14 is closed extends through a rod seal or the like 56 that is positioned in a corresponding groove in the poppet cage 28 between the inlet bore 16 and the flow ports 36. In this position, the outer diameter surface of the lower end portion 54 seals against the rod seal 56 and thereby prevents fluid in the flow line 18 from flowing through the flow ports 36. In the alternative embodiment of the invention shown in FIG. 2A, the poppet 52 comprises a piston seal or the like 56' around the lower end portion 54 which when the poppet is in its closed position seals against the inner diameter surface 33 of the poppet cage below the flow ports 36. Alternatively, the piston seal 56' may seal to the valve bore 22 located below the poppet cage 28.

Referring again to FIG. 1, the poppet 52 also includes an enlarged diameter upper end portion 58 which engages an annular stop 59 on the inner diameter surface of the poppet cage 28 in order to limit the extent to which the lower end portion 54 moves relative to the flow ports 36 when the poppet valve 14 is closed. A ring seal 60 mounted on the upper end portion 58 engages the inner diameter surface of the poppet cage 28 to thereby form a sealed fluid chamber 62 between the poppet 52 and the body cap 46. As will be described more fully below, a substantially non-compressible fluid in the fluid chamber 62 controls whether the poppet valve 14 remains in its closed position or is permitted to move to its open position. When the poppet valve 14 is permitted to move to its open position, the lower end portion 54 retracts to a position above the flow ports 36 to thereby allow fluid in the flow line 18 to flow through the flow ports and into the outlet bore 20.

An optional stem 64 extends axially from the piston portion 58 through a corresponding hole 66 in the body cap 46. The stem 64 is sealed to the hole 66 by a suitable ring seal 68 to maintain the pressure integrity of the fluid chamber 62. When the poppet valve 14 is in its closed position, the top of the stem 64 is generally flush with the body cap 46. However, when the poppet valve 14 is in its open position, the stem 64 projects beyond the body cap 46. Thus, the stem 64 provides a visual indication of the open or closed state of the poppet valve 14.

In the alternative embodiment of the invention shown in FIG. 2A, the optional stem 64 is omitted from the poppet 52 and the hole 66 is omitted from the body cap 46. In addition, instead of positioning the ring seal 60 in an annular groove on the outer diameter of the poppet 52, a ring seal 60' is positioned in an annular groove on the inner diameter of the poppet cage 28.

Figure 3:
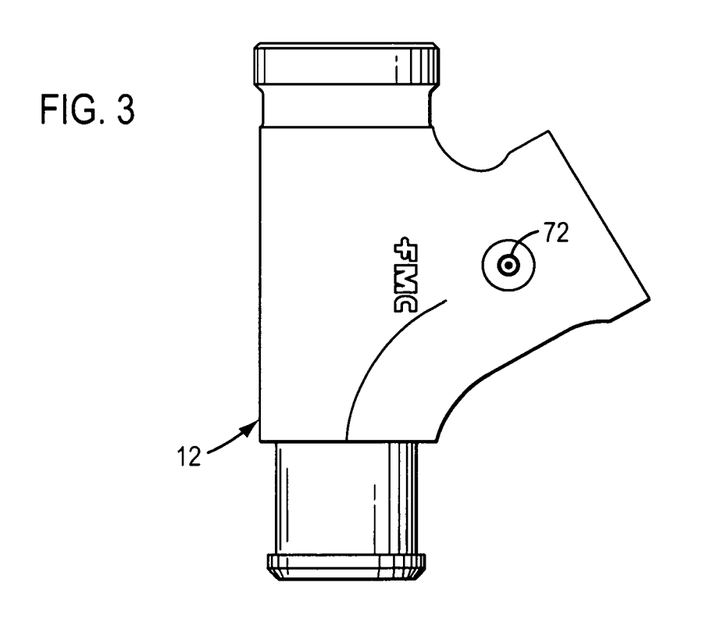
FIG. 3 is a side elevation view of the pressure relief valve shown in FIG. 1.

In accordance with the present invention, the poppet valve 14 is maintained in its closed position by filling the fluid chamber 62 with a substantially non-compressible fluid, such as hydraulic fluid. Referring again to FIG. 1, the hydraulic fluid is conveyed to the fluid chamber 62 through a solenoid operated pilot valve 70. Referring also to FIG. 3, the pilot valve 70 is connected to a supply/exhaust hole 72 in the valve body 12, which is fluidly connected to the upper annulus 40 located between the valve bore 22 and the poppet cage 28. The upper annulus 40 in turn is connected to the fluid chamber 62 through a supply/exhaust port 74 in the poppet cage 28 (FIG. 2).

The pilot valve 70 may be activated by a suitable controller 76 in response to signals generated by a pressure transducer 78. The pressure transducer 78 may be positioned in the flow line 18 or in the inlet port 16. When the controller 76 determines from the signals generated by the pressure transducer 78 that an overpressure event is occurring in the flow line 18, the controller will open the pilot valve 70 to vent the hydraulic fluid from the fluid chamber 62. This will allow the pressure in the flow line 18 to force the poppet 52 into its open position and thus allow fluid in the flow line to be discharged through the flow ports 36 and the outlet bore 20. In certain embodiments of the invention, the controller 76 may comprise a control relay and the pressure transducer 78 may comprise a line pressure gauge which generates a signal in response to an overpressure event that is relayed by the controller to the pilot valve 70 in order to open the pilot valve.

In operation of an exemplary embodiment of the invention, the fluid chamber 62 is preferably completely filled with hydraulic fluid at a pressure of about, e.g., 250 psi. The pilot valve 70 is then closed to trap the hydraulic fluid in the fluid chamber 62. The pilot valve 70 may be a 2-way valve which is normally closed when the solenoid is energized and is capable of achieving bubble tight shut-off at any pressure up to the rated pressure of the pressure relief valve 10. Since the hydraulic fluid is substantially non-compressible, and since the fluid chamber 62 is preferably completely filled with the hydraulic fluid, the volume of the hydraulic fluid in the fluid chamber will not change (or will change only slightly) as the force generated by the pressure in the flow line 18 pushes against the lower end portion 54 of the poppet 52. Consequently, the hydraulic fluid trapped by the pilot valve 70 in the fluid chamber 62 will maintain the poppet 52 in the closed position against the force generated by pressure in the flow line 18. With respect to the embodiments of the invention shown in FIGS. 2 and 2A, the relatively fixed volume of hydraulic fluid in the fluid chamber 56 will prevent the poppet 52 from moving to the extent required for the lower end portion 54 to disengage from the rod seal 56 or for the piston seal 56' to disengage from the inner diameter surface 33 of the poppet cage 28 or the valve bore 22. Thus, the hydraulic fluid does not need to be pressurized in order to counterbalance the pressure in the flow line 18. This arrangement contrasts significantly with the prior art, in which the gas in the pressure cylinder must be pressurized to a level which is sufficient to counterbalance the pressure in the flow line in order to prevent the valve element from disengaging from its corresponding valve seat. In a preferred embodiment of the invention, the cross sectional area of the upper end portion 58 of the poppet 52, less the cross sectional area of the stem 64 (if present), is about the same as, but ideally no less than, the cross sectional area of the lower end portion 54. This will ensure that the volume of hydraulic fluid required to control the poppet 52 is minimized and that the pressure of the hydraulic fluid will never be higher than the pressure in the flow line 18.

The pressure transducer 78 monitors the pressure in the flow line 18 and, when this pressure reaches a predetermined relief pressure, the controller 76 will de-energize the solenoid to open the pilot valve 70. This will allow the hydraulic fluid to exit the fluid chamber 62 through the supply/exhaust port 74, the upper annulus 40 and the supply exhaust hole 72 as the poppet 52 is opened by the force of the pressure in the flow line 18. After pressure in the flow line 18 is relieved through the pressure relief valve 10, the fluid chamber 62 is once again filled with hydraulic fluid at a pressure of about, e.g., 250 psi to move the poppet 52 to its closed position and thereby close the pressure relief valve 10, after which the pilot valve 70 is again closed to trap the hydraulic fluid in the fluid chamber.

Figure 4:
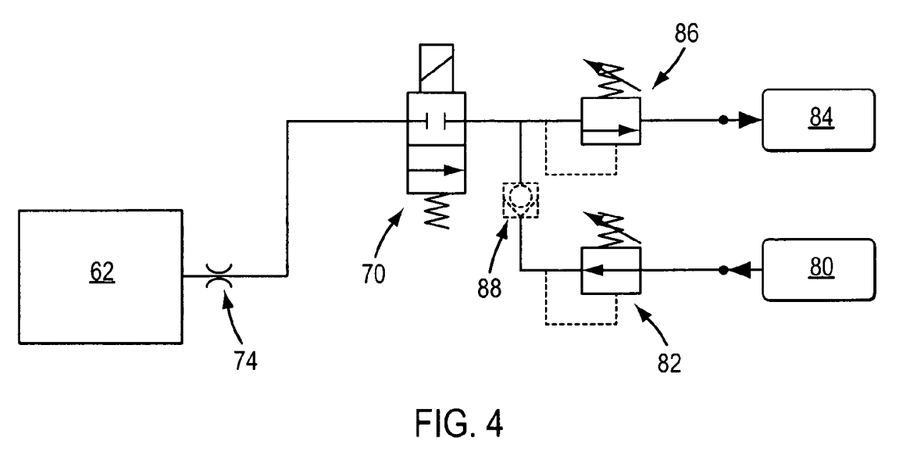
FIG. 4 is a schematic view of one embodiment of a piloting system for the pressure relief valve of the present invention.

The fluid chamber 62 may be supplied with hydraulic fluid using a piloting system such as shown in FIG. 4. In this embodiment, the fluid chamber 62 is connected to a source of hydraulic fluid 80 through the pilot valve 70 and a hydraulic reducing valve 82. In addition, the fluid chamber 62 is connected to a hydraulic sump 84 through the pilot valve 70 and a hydraulic relief valve 86. When the pilot valve 70 is opened in response to an overpressure event, the hydraulic fluid in the fluid chamber 62 is vented through the hydraulic relief valve 86 and into the hydraulic sump 84. In this embodiment, the diameter of the supply/exhaust port 74 in the poppet cage 28 is chosen so that when the pilot valve 70 is open, the pressure between the supply/exhaust port and the hydraulic reducing and hydraulic relief valves 82, 86 does not exceed the pressure rating of the valves, which may be, e.g., about 3,000 psi.

Once the pressure of the piloting system drops to below the set pressure of the hydraulic relief valve 86, the hydraulic relief valve closes and the hydraulic reducing valve 82 opens to once again supply the fluid chamber 62 with hydraulic fluid at a pressure of about, e.g., 250 psi, which causes the poppet 52 to move into its closed position and thereby close the pressure relief valve 10. In this regard, the set pressure of the hydraulic relief valve 86 may be somewhat higher than the set pressure of the hydraulic reducing valve 82. This arrangement allows the hydraulic fluid from the fluid chamber 62 to flow only through the hydraulic relief valve 86. When pressure in the hydraulic relief valve 86 goes to below its set point, the pressure in the piloting system will have dropped below the set pressure of the hydraulic reducing valve 82. This allows the hydraulic reducing valve 82 to open and recharge the piloting system.

As an alternative to the piloting system just described, the pilot valve 70 may comprise a 3-position, 3-way pilot valve. In this case, the hydraulic relief and hydraulic reducing valves 82, 86 would not be necessary. Instead, in one position the pilot valve 70 would connect the fluid chamber 62 to the source of hydraulic fluid 80, in a second position the pilot valve would connect the fluid chamber to a hydraulic sump, such as the hydraulic sump 84, and in a third position the pilot valve would be closed.

As a alternative to the second piloting system just described, the pilot valve 70 may comprise a 2-position, three-way pilot valve. In this embodiment, the third position is eliminated by adding a check valve 88 (shown in phantom in FIG. 4) between the pilot valve 70 and the source of hydraulic fluid 80. The check valve 88 would allow flow from the source of hydraulic fluid 80 when the piloting system and fluid chamber 62 are being recharged. After recharging, the check valve would then act to trap hydraulic fluid in the fluid chamber 62.

Figure 5:
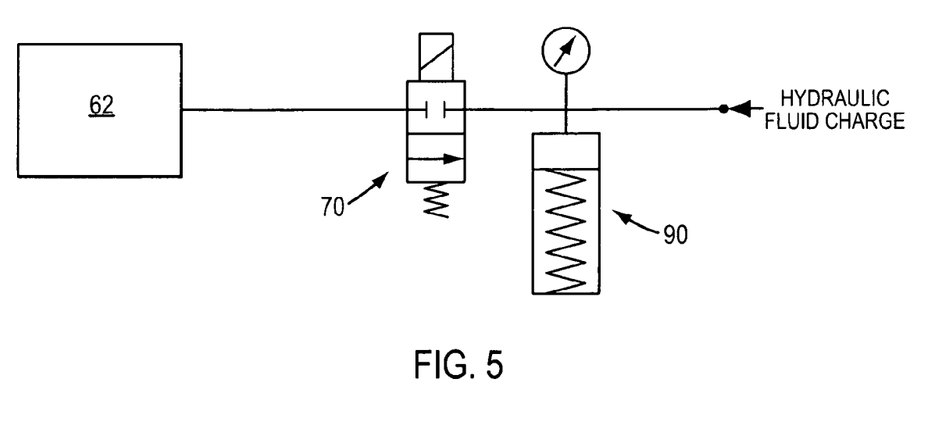
FIG. 5 is a schematic view of another embodiment of a piloting system for the pressure relief valve of the present invention.

Another embodiment of a piloting system for supplying the fluid chamber 62 with hydraulic fluid is shown in FIG. 5. In this system the fluid chamber 62 is connected through the pilot valve 70 to an accumulator or spring return cylinder 90, which in this embodiment of the invention functions as both a source of hydraulic fluid and a hydraulic sump. The accumulator or spring return cylinder 90 is initially charged with hydraulic fluid at a pressure of about, e.g., 250 psi. In operation of this embodiment, the pilot valve 70 is opened to allow hydraulic fluid to flow from the accumulator or spring return cylinder 90 into the fluid chamber 62, after which the pilot valve 70 is closed to trap the hydraulic fluid in the fluid chamber. During an overpressure event, the pilot valve 70 is opened and the hydraulic fluid is forced from the fluid chamber 62 back into the accumulator or spring return cylinder 90 as the poppet 52 is opened under the force of the pressure in the flow line 18. In this example, when the pilot valve 70 is opened in response to an overpressure event, the pressure in the accumulator or spring return cylinder 90 is lower than the pressure in the flow line 18 and the accumulator or spring return cylinder will therefore function as a hydraulic sump. Then, once the pressure in the flow line 18 is relieved, the accumulator or spring return cylinder 90 forces the hydraulic fluid back into the fluid chamber 62 to re-seat the poppet 52 and thereby close the pressure relief valve 10, after which the pilot valve 70 is closed to trap the hydraulic fluid in the fluid chamber. In the case where the poppet 52 does not employ the optional stem 64 for providing a visual indication of the open or closed state of the poppet valve 14, a similar indicator may be added to the accumulator or spring return cylinder 90 for this purpose.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A pressure relief valve which comprises:
    a valve body which includes an inlet bore that is connectable to a flow line, an outlet bore that is connectable to a vent line and a valve bore that extends between the inlet and outlet bores;
    a valve member which is axially movable in the valve bore between a closed position in which fluid in the flow line is prevented from flowing between the inlet and outlet bores and an open position in which the fluid in the flow line is permitted to flow between the inlet and outlet bores;
    a fluid chamber which is located in the valve bore adjacent the valve member;
    a source of hydraulic fluid which is connected to the fluid chamber; and
    a solenoid operated pilot valve which is connected between the fluid chamber and the source of hydraulic fluid;
    wherein during operation of the pressure relief valve the pilot valve is initially opened to fill the fluid chamber with hydraulic fluid, then is closed to isolate the source of hydraulic fluid from the fluid chamber and trap the hydraulic fluid in the fluid chamber to thereby maintain the valve member in its closed position against pressure in the flow line, and then, when the pressure in the flow line reaches a predetermined level, is opened to release the hydraulic fluid from the fluid chamber into a hydraulic sump and thereby allow the valve member to move from its closed position to its open position.

2. The pressure relief valve of claim 1, wherein the valve member comprises a cylindrical poppet which comprises an upper end portion adjacent to the fluid chamber and a lower end portion which in the closed position of the poppet blocks the fluid from flowing between the inlet and outlet bores and in the open position of the poppet permits the fluid to flow between the inlet and outlet bores.

3. The pressure relief valve of claim 2, wherein in the closed position of the poppet the lower end portion extends through and seals against a seal which is positioned between the inlet and outlet bores to thereby prevent fluid in the flow line from flowing between the inlet and outlet bores.

4. The pressure relief valve of claim 2, wherein in the closed position of the poppet a seal mounted on the lower end portion seals to a portion of the pressure relief valve located between the inlet and outlet bores to thereby prevent fluid in the flow line from flowing between the inlet and outlet bores.

5. The pressure relief valve of claim 1, further comprising:
a pressure transducer which generates signals indicative of the pressure in the flow line; and
a controller which actuates the pilot valve in response to the signals generated by the pressure transducer;
wherein when the pressure in the flow line reaches the predetermined level, the controller opens the pilot valve to release the hydraulic fluid from the fluid chamber and thereby allow the valve member to move from its closed position to its open position.

6. The pressure relief valve of claim 2, wherein the poppet is slidably supported in a poppet cage which is positioned in the valve bore and which comprises a number of transverse flow ports which are located between the inlet and outlet bores.

7. The pressure relief valve of claim 6, wherein in the closed position of the poppet the lower end portion seals against a rod seal which is positioned between the inlet bore and the flow ports.

8. The pressure relief valve of claim 6, wherein in the closed position of the poppet a seal mounted on the lower end portion seals to a portion of the pressure relief valve located between the inlet and outlet bores to thereby prevent fluid in the flow line from flowing between the inlet bore and the flow ports.

9. The pressure relief valve of claim 6, wherein the fluid chamber is located within the poppet cage.

10. The pressure relief valve of claim 9, wherein the pilot valve is connected to the fluid chamber through a port in the poppet cage.

11. The fluid chamber of claim 10, wherein the pilot valve is connected to the port through a hole in the valve body.

12. The pressure relief valve of claim 11, wherein the hole is connected to the port through a sealed annulus between the poppet cage and the valve bore.

13. The pressure relief valve of claim 6, wherein the poppet cage is retained in the valve bore by a cap member which is secured to the valve body.

14. The pressure relief valve of claim 13, further comprising a stem which extends axially from the poppet through a corresponding hole in the cap member, wherein the position of the stem provides a visual indication of the open or closed position of the poppet.

15. The pressure relief valve of claim 1, wherein the valve member comprises a generally cylindrical poppet and the pressure relief valve further comprises:
a poppet cage which is positioned in the valve bore and within which the poppet is slidably supported, the poppet cage comprising a number of flow ports which are located between the inlet and outlet bores;
a cap member which is secured to the valve body over the valve bore to thereby retain the poppet cage in the valve bore;
a first seal which is positioned between the poppet cage and a portion of the poppet that is located between the flow ports and the cap member; and
a second seal which is positioned between the cap member and at least one of the poppet cage and the valve body;
wherein the fluid chamber is located within the poppet cage between the first and second seals.

16. The pressure relief valve of claim 15, wherein the pilot valve is connected to the fluid chamber through a port in the poppet cage.

17. The pressure relief valve of claim 16, wherein the pilot valve is connected to the port through a hole in the valve body.

18. The pressure relief valve of claim 17, wherein the hole is connected to the port through a sealed annulus located between the poppet cage and the valve bore.

19. The pressure relief valve of claim 15, wherein a distal end of the poppet cage comprises a circular seat which engages an annular shoulder in the valve body that is located between the net and outlet bores.

20. The pressure relief valve of claim 19, further comprising a seal which is positioned at an intersection of the seat and the shoulder and against which a lower end portion of the poppet seals when the poppet is in the closed position.

21. The pressure relief valve of claim 19, further comprising a seal which is mounted on a lower end portion of the poppet and which seals against a portion of at least one of the poppet cage and the valve body located proximate an intersection of the seat and the shoulder when the poppet is in the closed position.

22. The pressure relief valve of claim 15, wherein the poppet comprises an axial stem which extends through a corresponding hole in the cap member to provide a visual indication of the open or closed position of the poppet.

23. The pressure relief valve of claim 1, further comprising a hydraulic reducing valve which is connected between the pilot valve and the source of hydraulic fluid.

24. The pressure relief valve of claim 23, further comprising a hydraulic relief valve which is connected between the pilot valve and the hydraulic sump, wherein when the pressure in the flow line reaches the predetermined level, the hydraulic fluid is conveyed from the pilot valve through the hydraulic relief valve and into the hydraulic sump.

25. The pressure relief valve of claim 24, wherein:
the valve member comprises a generally cylindrical poppet which is slidably supported in a poppet cage that is positioned in the valve bore;
the pilot valve is connected to the fluid chamber through a port in the poppet cage; and
the diameter of the port is selected so that, when the pilot valve is open, the pressure between the port and the hydraulic reducing and hydraulic relief valves does not exceed a pressure rating of the hydraulic reducing and hydraulic relief valves.

26. The pressure relief valve of claim 1, wherein the source of hydraulic fluid comprises an accumulator which is charged with hydraulic fluid at a pressure which is sufficient to fill the fluid chamber when the pilot valve is initially opened, and wherein the accumulator defines the hydraulic sump when the pilot valve is opened to release the hydraulic fluid from the fluid chamber when the pressure in the flow line reaches the predetermined level.

27. The pressure relief valve of claim 1, wherein the source of hydraulic fluid comprises a spring return cylinder which is charged with hydraulic fluid at a pressure which is sufficient to fill the fluid chamber when the pilot valve is initially opened, and wherein the spring return cylinder defines the hydraulic sump when the pilot valve is opened to release the hydraulic fluid from the fluid chamber when the pressure in the flow line reaches the predetermined level.

28. A method for operating a pressure relief valve which comprises an inlet bore that is connectable to a flow line, an outlet bore that is connectable to a vent line, and a valve bore that extends to between the inlet and outlet bores, the method comprising:
- providing a valve member which is axially movable in the valve bore between a closed position in which the valve member blocks fluid in the flow line from flowing between the inlet and outlet bores and an open position in which the valve member permits fluid in the flow line from flowing between the inlet and outlet bores;
- providing a fluid chamber which is located in the valve bore adjacent an end of the valve member;
- connecting to the fluid chamber to a source of hydraulic fluid;
- providing a solenoid operated pilot valve which is connected between the fluid chamber and the source of hydraulic fluid;
- opening the pilot valve to fill the fluid chamber with hydraulic fluid; then
- closing the pilot valve to trap the hydraulic fluid in the fluid chamber and thereby maintain the valve member in its closed position against pressure in the flow line; and then
- closing the pilot valve to isolate the source of hydraulic fluid from the fluid chamber and trap the hydraulic fluid in the fluid chamber to thereby maintain the valve member in its closed position against pressure in the flow line; and then
- when the pressure in the flow line reaches a predetermined level, opening the pilot valve to release the hydraulic fluid from the fluid chamber into a hydraulic sump and thereby allow the valve member to move from its closed position to its open position.

29. The method of claim 28, wherein the valve member comprises a generally cylindrical poppet which comprises an upper end portion adjacent which the fluid chamber is located and a lower end portion which in the closed position of the poppet blocks the fluid from flowing between the inlet and outlet bores and in the open position of the poppet permits the fluid to flow between the inlet and outlet bores.

30. The method of claim 29, wherein in the closed position of the poppet the lower end portion extends through and seals against a seal which is positioned between the inlet and outlet bores to thereby prevent fluid in the flow line from flowing between the inlet and outlet bores.

31. The pressure relief valve of claim 29, wherein in the closed position of the poppet a seal mounted on the lower end portion seals to a portion of the pressure relief valve located between the inlet and outlet bores to thereby prevent fluid in the flow line from flowing between the inlet and outlet bores.

* * * * *